(12) United States Patent
Ostendorf et al.

(10) Patent No.: US 10,860,111 B2
(45) Date of Patent: Dec. 8, 2020

(54) MOTOR VEHICLE OPERATING UNIT AND A METHOD OF CONFIRMING A SWITCHING COMMAND

(71) Applicant: BCS AUTOMOTIVE INTERFACE SOLUTIONS GMBH, Radolfzell (DE)

(72) Inventors: Jens Ostendorf, Radolfzell (DE); Markus Altmann, Radolfzell (DE)

(73) Assignee: BCS AUTOMOTIVE INTERFACE SOLUTIONS GMBH, Radolfzell (DE)

( * ) Notice: Subject to any disclaimer, the term of this patent is extended or adjusted under 35 U.S.C. 154(b) by 0 days.

(21) Appl. No.: 16/661,003

(22) Filed: Oct. 23, 2019

(65) Prior Publication Data
US 2020/0133396 A1 Apr. 30, 2020

(30) Foreign Application Priority Data
Oct. 24, 2018 (DE) .......................... 10 2018 126 536

(51) Int. Cl.
| | |
|---|---|
| *G06F 3/01* | (2006.01) |
| *B60W 50/16* | (2020.01) |
| *G06F 3/03* | (2006.01) |
| *B60K 37/06* | (2006.01) |
| *H02N 2/18* | (2006.01) |

(52) U.S. Cl.
CPC .............. *G06F 3/016* (2013.01); *B60K 37/06* (2013.01); *B60W 50/16* (2013.01); *G06F 3/03* (2013.01); *H02N 2/18* (2013.01)

(58) Field of Classification Search
CPC .............................. B60W 50/16; G06F 3/016
See application file for complete search history.

(56) References Cited

U.S. PATENT DOCUMENTS

| | | | |
|---|---|---|---|
| 9,182,824 B2 | 11/2015 | Schneider et al. | |
| 9,182,825 B2 | 11/2015 | Schneider et al. | |
| 2012/0286847 A1* | 11/2012 | Peshkin | G06F 3/044 327/517 |
| 2015/0009178 A1* | 1/2015 | Schneider | G06F 3/041 345/174 |
| 2016/0035504 A1* | 2/2016 | Bleckmann | H01H 3/0213 200/4 |
| 2017/0192541 A1* | 7/2017 | Bulea | G06F 3/016 |

FOREIGN PATENT DOCUMENTS

| | | |
|---|---|---|
| DE | 10154643 | 5/2003 |
| DE | 102014018352 | 6/2016 |
| DE | 102015100630 | 7/2016 |
| DE | 10201500859663 | 11/2016 |

* cited by examiner

*Primary Examiner* — Sepehr Azari
(74) *Attorney, Agent, or Firm* — Tarolli, Sundheim, Covell & Tummino LLP

(57) ABSTRACT

A motor vehicle operating unit for a motor vehicle, having a haptic feedback device and an operating surface rotatable about an axis of rotation, the axis of rotation being substantially parallel to a plane spanned by the operating surface in the initial position of the motor vehicle operating unit, the haptic feedback device being arranged so as to control the operating surface such that the operating surface rotates about the axis of rotation. A method of confirming a switching command by means of a motor vehicle operating unit is furthermore described.

15 Claims, 2 Drawing Sheets

MOTOR VEHICLE OPERATING UNIT AND A METHOD OF CONFIRMING A SWITCHING COMMAND

FIELD OF THE DISCLOSURE

Embodiments of the present disclosure relate generally to a motor vehicle operating unit for a motor vehicle. Embodiments of the present disclosure further relate to a method of confirming a switching command by means of a motor vehicle operating unit.

BACKGROUND

The prior art discloses different motor vehicle operating units which can be used in different places in a motor vehicle, for example as power-window modules, control modules and/or operating units of a multimedia system of the motor vehicle.

The motor vehicle operating units used today can have a capacitive operating element such that an approach and/or a touch of an operating surface of the operating element by a vehicle occupant can be detected to then perform an associated function. This is for example made possible by appropriate capacitive contact sensors, which form, for example, a capacitor between a printed circuit board and the operating surface and/or the finger of a vehicle occupant as they approach the operating surface.

Previously, mechanical switches were used to switch a correspondingly assigned function, as a result of which the vehicle occupant received an haptic feedback due to the mechanical switching path, so that he could be sure that the switch was switched and the corresponding function was performed.

In modern motor vehicles operating units having capacitive operating elements, the haptic feedback which is no longer present as the switching path is no longer existing is simulated via a haptic feedback device which usually generates a vibration of the operating surface.

To this end, the haptic feedback device can comprise an unbalance motor which generates a three-dimensional vibration of the operating surface, a solenoid which generates a vibration or oscillation in the X or Y direction, and/or an piezo- or silicon actuator which generates a motion in one direction.

The unbalance motor, the solenoid and the piezo or silicon actuator each generate a vibration which is to be made available as a haptic feedback to the vehicle occupant upon operation of the motor vehicle operating unit. This haptic feedback is intended to simulate or replace the haptic of the mechanical switching.

The motor vehicle operating units known from the prior art having the haptic feedback device have a complex structure to generate a vibration as a haptic feedback. Furthermore, undefined haptic feedback is always generated.

SUMMARY

In this respect, the object of the present disclosure is to provide a motor vehicle operating unit of a simple structure for a motor vehicle, which generates a defined haptic feedback in a simple manner.

The object is achieved by a motor vehicle operating unit for a motor vehicle, having a haptic feedback device and an operating surface rotatable about an axis of rotation, the axis of rotation being substantially parallel to a plane spanned by the operating surface in the initial position of the motor vehicle operating unit, the haptic feedback device being arranged so as to control the operating surface such that the operating surface rotates about the axis of rotation.

Furthermore, the object is achieved by a method of confirming a switching command by means of a motor vehicle operating unit, comprising the following steps:

sensing an approach to an operating surface of the motor vehicle operating unit, a touch of the operating surface of the motor vehicle operating unit, and/or an actuation of the operating surface of the motor vehicle operating unit, controlling a haptic feedback device assigned to the operating surface to output a haptic feedback, and actively rotating the operating surface about an axis of rotation which is substantially parallel to a plane spanned by the operating surface in the initial position of the motor vehicle operating unit, the rotary motion of the operating surface being initiated by the control of the haptic feedback device.

The basic idea of the present disclosure is to generate the haptic feedback by a defined rotation of the operating surface, so that no undefined vibration occurs at the operating surface, which could lead to an undefined haptic feedback of the vehicle occupant. Since the operating surface has a defined axis of rotation, the defined rotation of the operating surface is obtained if the haptic feedback device is controlled accordingly to output the defined haptic feedback. The axis of rotation is substantially parallel to a plane spanned by the operating surface, which means that the plane spanned by the operating surface is not crossed by the axis of rotation as would be the case with a skew arrangement. In other words, the axis of rotation lies in a plane which, in the initial position of the motor vehicle operating unit, is parallel to the plane spanned by the operating surface. The rotation of the operating surface can thus be used to signal to the vehicle occupant that the correspondingly assigned function has been triggered or switched. The vehicle driver thus receives an unambiguous haptic feedback via the rotation of the operating surface about the defined axis of rotation.

Basically, the rotary motion is a rotation along the axis of rotation, which (substantially) runs centrally along a longitudinal axis of the operating surface, in particular in a plane spanned by the operating surface perpendicularly offset to the longitudinal axis.

The defined rotary motion of the operating surface thus corresponds to a rotation in two directions about the axis of rotation. Therefore, this exactly does not constitute an undefined vibration, as is usually the case with an unbalance motor, a solenoid and/or a piezo or silicon actuator. A rotary motion does not correspond to a pivoting motion about an axis, either, which is for example assigned to one end of the operating surface.

In other words, in case of a rotary motion, an area of the operating surface is rotated in a first direction, whereas a second area is rotated in a second direction, opposite to the first direction.

One aspect provides that a housing is provided in which the haptic feedback device is received, the haptic feedback device in particular comprising at least one actuator which is at least partially supported on the housing. The haptic feedback device is therefore received in the housing in a protected manner. The haptic feedback device can include an actuator which is partially supported on the housing, such that a motion of the actuator can be initiated which serves to move the operating surface, i.e. to rotate the operating surface about the axis of rotation. The actuator can be an unbalance motor, a piezo actuator, a silicon actuator, and/or a solenoid.

A further aspect provides that the haptic feedback device is coupled with the operating surface via a motion coupling member, the operating surface being in particular rotatably mounted on the housing via the motion coupling member. The motion originating from the haptic feedback device as generated by the actuator is therefore transmitted to the operating surface via the motion coupling member, such that the operating surface is rotated about the axis of rotation. The motion coupling member can be mounted on the housing such that the axis of rotation of the operating surface is defined by the bearing. This means that the motion coupling member is for example mounted on the housing by two opposite ends, the two bearing points defining the axis of rotation about which the operating surface which is coupled to the motion coupling member is rotated.

The axis of rotation can be defined via two bearing points of the motion coupling member, the bearing points being in particular assigned to opposite ends of the operating surface.

In particular, the motion coupling member may be configured so as to convert a motion of the haptic feedback device in several directions into a rotary motion of the operating surface about the axis of rotation. The motion coupling member is thus oscillated by the haptic feedback device in the usual manner, in particular in an undefined manner, the motion initiated by the haptic feedback device being converted via the motion coupling member into a defined rotary motion of the operating surface about the axis of rotation, such that the operating surface rotates about the axis of rotation.

The operating surface is for example part of an operating unit which is at least partially received in the housing. In addition to the operating surface, the operating unit may include further components which are necessary for the detection of an approach, a touch or an actuation of the operating surface, such as an electrode and/or a sensor. The operating unit can therefore be configured as a capacitive operating unit.

Basically, the operating unit can be configured as a pre-assembled assembly which is inserted into the housing of the motor vehicle operating unit. As an alternative or supplementary measure, it may be provided to couple the pre-assembled operating unit with a printed circuit board carrier to form the motor vehicle operating unit. The printed circuit board carrier may be a base plate or a basic element of the motor vehicle operating unit.

One aspect provides that the operating unit has at least one sensor for detecting a touch of the operating surface, an actuation of the operating surface, and/or an approach to the operating surface, the operating unit in particular comprising a capacitive sensor and/or a force sensor. The at least one sensor can be provided for detecting the actuation of the motor vehicle operating unit, in particular of a button of the motor vehicle operating unit, the sensor being able to detect an approach, in particular if the sensor is configured as a capacitive sensor. If the sensor is a force sensor, the sensor is adapted to detect a pressure on the operating surface in a simple manner. The force sensor can be configured to detect different forces such that different switching functions are triggered depending on the force. With a low force, a first switching function can be triggered, whereas with a higher force, a second switching function is triggered. Touching or actuating the operating surface can also be detected via a capacitive sensor.

In addition, a printed circuit board assigned to the operating surface may be provided, the printed circuit board being in particular part of the operating unit. The printed circuit board may comprise electronic components which serve to detect the approach, the touch or the actuation of the operating surface. Furthermore, the control logic for the haptic feedback device can be provided on the printed circuit board. The haptic feedback device, in particular the actuator of the haptic feedback device, may be coupled directly with the printed circuit board such that the actuator is controlled directly via the printed circuit board.

One aspect provides that the printed circuit board is motionally decoupled from the operating surface. In this respect, the operating surface is rotated relative to the printed circuit board if the haptic feedback device generates a haptic feedback. This creates a compact structure as the entire haptic feedback device is not rotated to generate the haptic feedback. Only the operating surface is rotated about the axis of rotation, in particular via the motion coupling member such that a small force is sufficient to set the operating surface in rotation. It is thus possible to configure the haptic feedback device at correspondingly low costs.

A further aspect provides that the operating surface is configured so as to be closed and comprises at least two buttons, the at least two in particular forming a key contour on the operating surface which is configured in a closed manner. The closed operating surface corresponds to a continuous screen or to a display. As the respective buttons have a key contour, the different buttons can be touched accordingly by the vehicle occupant. Furthermore, several key functions can be formed on the closed operating surface, these being adapted to be provided next to each other on the operating surface, i.e. in the plane spanned by the operating surface.

Generally, the operating surface can be formed on an operating element, the entire operating element and thus also the operating surface being in particular rotated about the axis of rotation. The operating element can be part of the operating unit. The operating element may have a mount for the motion coupling member such that the motion of the motion coupling member causes the operating element to rotate.

The motion coupling member can be received in the mount with an interlocking and/or a frictional fit.

In addition, it may be provided that the motion coupling member and/or the operating element is pre-tensioned to the initial or neutral position by means of a spring, such that the operating element automatically switches to the initial or neutral position when the haptic feedback device is no longer controlled in order to rotate the operating surface, i.e. to output a haptic feedback. This ensures that the initial or neutral position is easily reached.

The spring can rest on the housing and thus act between the housing and the operating element or the motion coupling member.

DESCRIPTION OF THE DRAWINGS

Further advantages and characteristics of the present disclosure will become apparent from the following description and the drawings to which reference is made. The drawings show.

DETAILED DESCRIPTION OF THE DRAWINGS

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
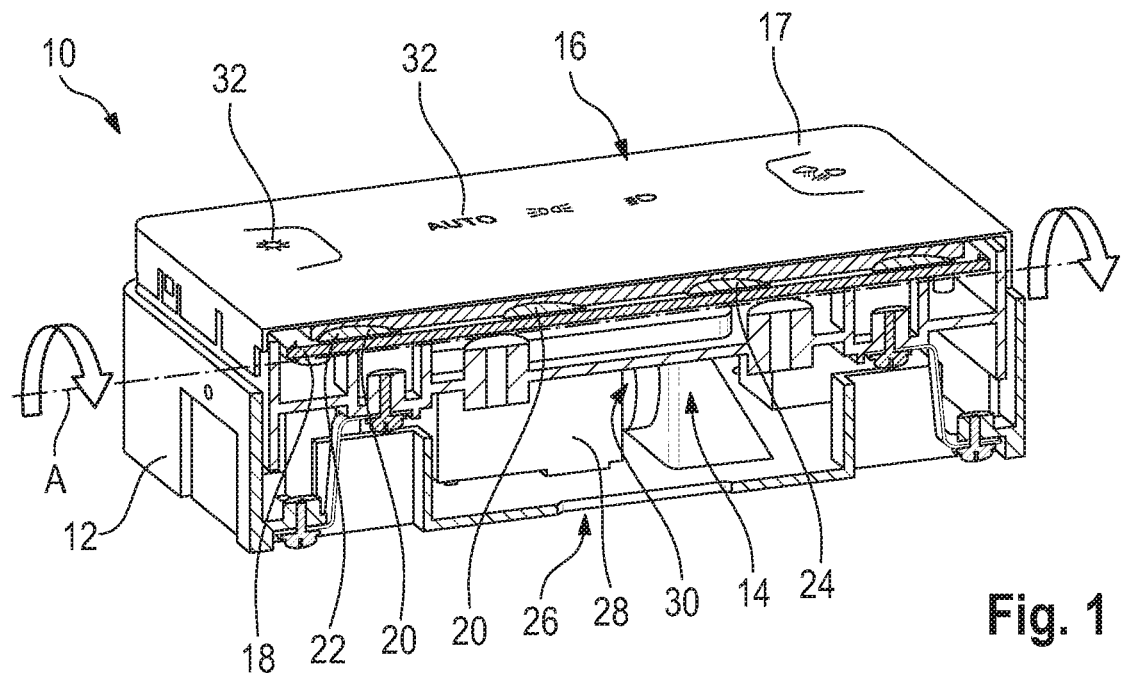
FIG. 1 a schematic sectional view of a motor vehicle operating unit according to the present disclosure in a first embodiment, FIG. 2 a sectional view of a motor vehicle operating unit according to the present disclosure in a second embodiment, FIG. 3 the sectional view of FIG. 2 in a different sectional plane, and FIG. 4 a sectional view of FIGS. 2 and 3 rotated by 90°.

FIG. 1 shows a motor vehicle operating unit 10 for a motor vehicle, comprising a housing 12 and an operating unit 14 partially received in the housing 12.

The operating unit 14 comprises an outwardly facing operating surface 16 operated by a vehicle occupant to switch a function of the motor vehicle operating unit 10 on or off.

The operating surface 16 is formed on an operating element 17.

Furthermore, the operating unit 14 comprises a printed circuit board 18 which is formed separately from the operating surface 16 or the operating element 17 and which is assigned to the operating surface 16. The printed circuit board 18 can furthermore be assigned to a printed circuit board carrier, in particular be attached thereto. The printed circuit board carrier is for example a base plate or a basic element of the motor vehicle operating unit 10.

Several sensors 20 may be provided on the printed circuit board 18, as in the embodiment according to FIG. 1, which serve to detect a touch of the operating surface 16, an actuation of the operating surface 16, and/or an approach to the operating surface 16. In this respect, the sensors 20 may be capacitive sensors 22 and/or force sensors 24, which are adapted to detect an approach, a touch and/or a force of the touch (actuation).

The sensors 20 are directly coupled with the printed circuit board 18 such that the acquired signals can be processed immediately.

Alternatively, it can be provided that the several sensors 20 are provided on a capacitive foil which is formed separately from the printed circuit board 18. The capacitive foil can be assigned to the operating surface 16, in particular be attached to the operating surface 16. For example, the capacitive foil is glued to the operating surface 16.

FIG. 1 also shows that the motor vehicle operating unit 10 comprises a haptic feedback device 26 which is assigned to the operating unit 14, in particular to the operating surface 16 or the operating element 17.

The haptic feedback device 26 has an actuator 28, which in the embodiment shown is configured as a solenoid, which is at least partially supported on the housing 12.

The actuator 28 is mechanically coupled with the operating surface 16 or the operating element 17 comprising the operating surface 16 via a motion coupling member 30, which converts a motion of the haptic feedback device 26, in particular the actuator 28, into a rotary motion of the operating surface 16 about an axis of rotation A. In this respect, there is a motional coupling of the actuator 28 and the operating surface 16 or the operating element 17, namely via the motion coupling member 30.

This means that the haptic feedback device 26 actively rotates the operating surface 16 or the operating element 17 about the axis of rotation A if a haptic feedback is to be output.

The operating surface 16 thus rotates about the defined axis of rotation A instead of vibrating, such that an unambiguous haptic feedback is generated at the operating surface 16, which can be perceived accordingly by the vehicle occupant.

Since the motion coupling member 30 is provided between the actuator 28 of the haptic feedback device 26 and the operating surface 16 of the operating unit 14, the printed circuit board 18 is motionally decoupled from the operating surface 16, as the printed circuit board 18 is not rotated.

However, the printed circuit board 18 can be mounted in a floating manner, such that the printed circuit board 18 is mounted in the motor vehicle operating unit 10 in a substantially position-accurate manner with respect to the housing 12, even if the operating surface 16 of the motor vehicle operating unit 10 rotates.

Furthermore, the haptic feedback device 26, in particular the actuator 28, does not rotate during the output of a haptic feedback.

Consequently, only the operating element 17 and the operating surface 16 provided thereon rotate about the axis of rotation A if a haptic feedback is to be output.

FIG. 1 further shows that the operating surface 16 is configured so as to be closed, several separately configured buttons 32 being provided on the operating surface 16, to each of which different switching functions are assigned.

A key contour can be assigned to each of the individual buttons 32 of the operating surface 16 which is configured in a closed manner, such that the individual buttons 32 differ haptically from each other. In other words, the buttons 32 can be touched by the vehicle occupant such that he can see via his fingers which of the several buttons 32 he is currently actuating without seeing the corresponding button and the displayed switching symbol. In particular, the contours of the individual buttons 32 are different from each other so that they can be distinguished haptically.

Basically, the motion coupling member 30 can be designed as a light guide which serves to backlight the operating surface 16, in particular the individual buttons 32.

The motion coupling member 30 includes for example at least one reflector or one reflective section via which light emitted by lighting means is directed to the operating surface 16.

The lighting means may be arranged on the printed circuit board 18.

Figure 2:
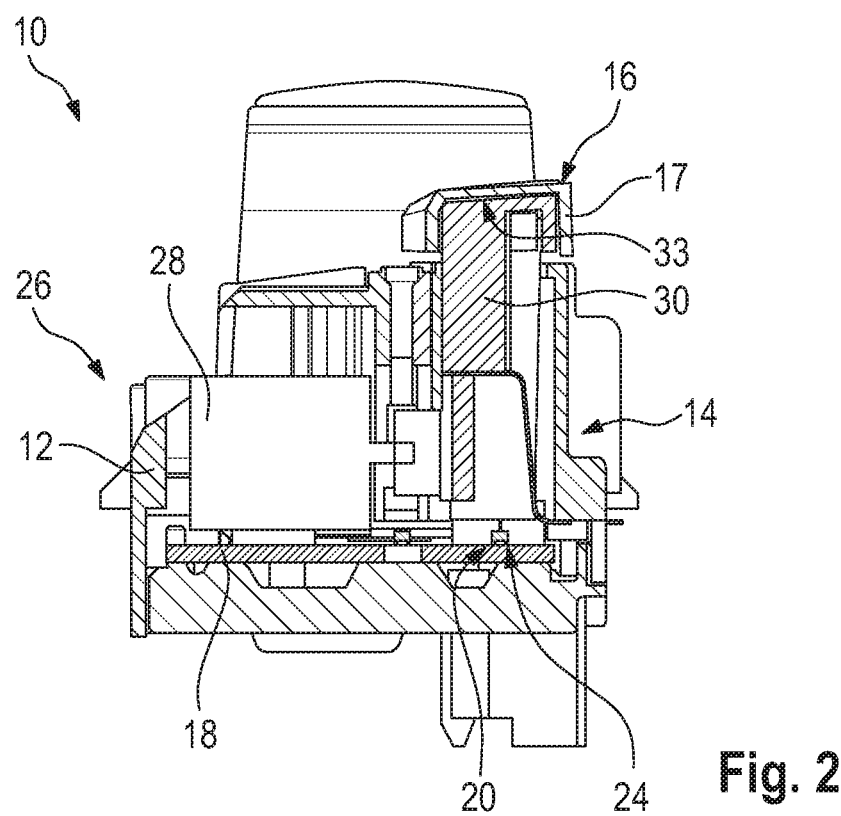
Figure 3:
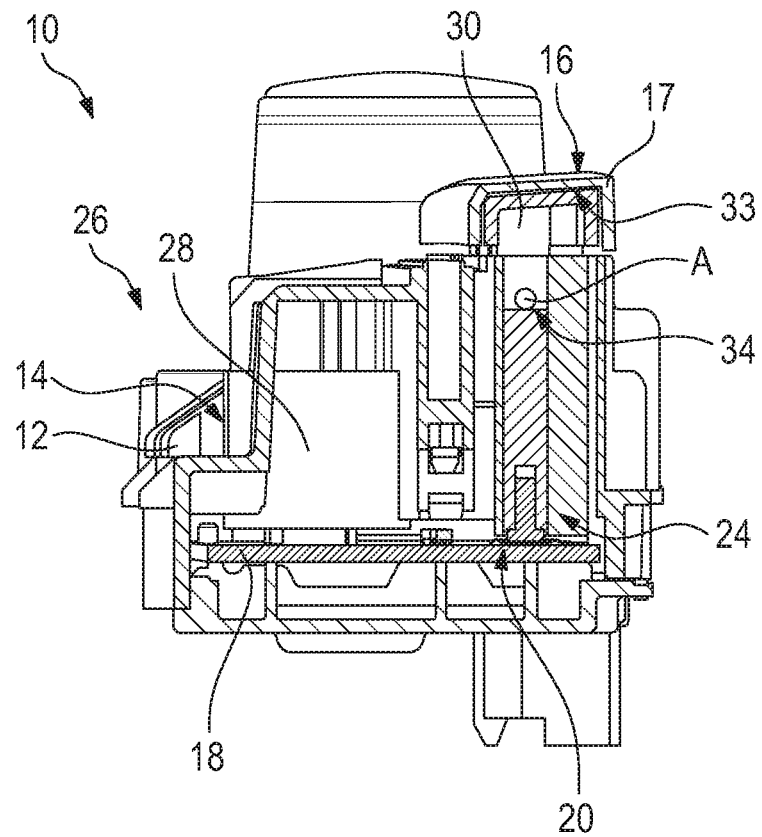
Figure 4:
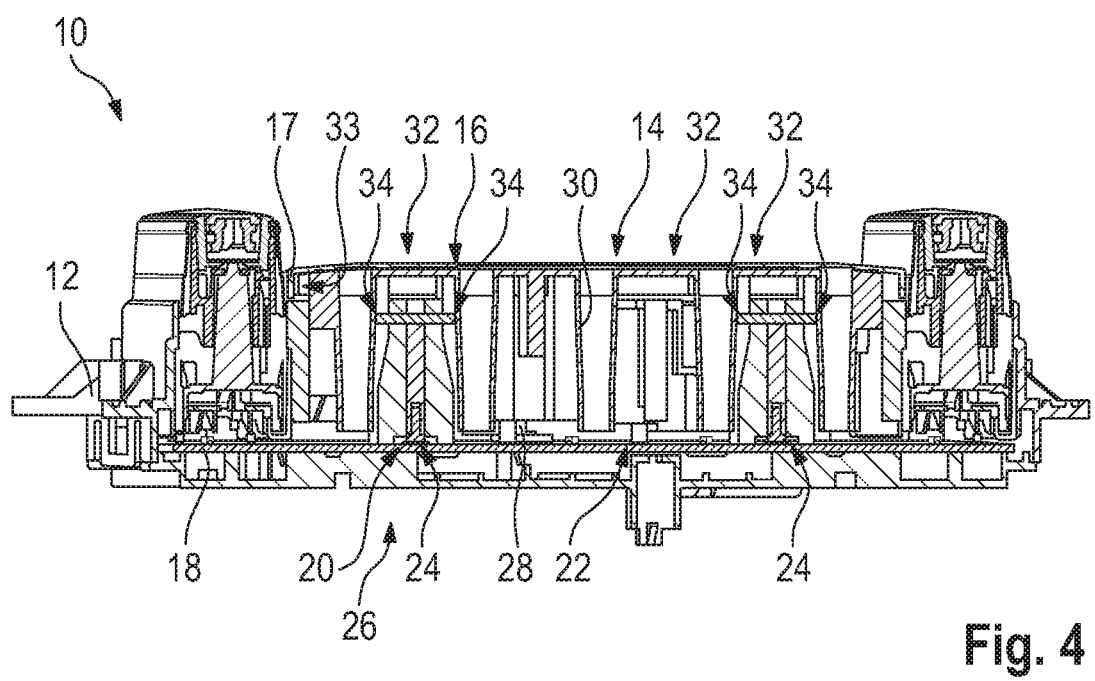

FIGS. 2 to 4 show a second embodiment of the motor vehicle operating unit 10 which differs from the first embodiment shown only in that the actuator 28 of the haptic feedback device 26 is arranged on the side of the printed circuit board 18 facing the operating surface 16. This results in a simpler motion transfer from the actuator 28 to the operating element 17 or the operating surface 16 via the motion coupling member 30.

The actuator 28 is directly coupled to the (fixedly arranged) printed circuit board 18, such that the printed circuit board 18 can comprise the control logic for the actuator 28 or the haptic feedback device 26.

FIG. 2 further shows that the actuator 28 is directly coupled to the motion coupling member 30 which extends through the housing 12 to the operating element 17 which has a mount 33 for the motion coupling member 30.

The mount 33 is provided on the side of the operating element 17 opposite to the operating surface 16.

A motion initiated by the actuator 28 is converted into a rotary motion of the operating surface 16 about the axis of rotation A via the motion coupling member 30.

The operating element 17 and/or the motion coupling member 30 is mounted accordingly on the housing 12 to define the axis of rotation A.

This is illustrated in FIGS. 3 and 4. The figures show that the motion coupling member 30 is mounted on the housing 12, the corresponding bearing points 34 defining the axis of rotation A.

Using the motor vehicle operating units 10, a switching command can be easily confirmed by first detecting an approach to the operating surface 16, a touch, or actuation (pressing) of the operating surface 16 via the corresponding sensors 20.

The sensors 20 forward the signal to the printed circuit board 18, the control logic for the haptic feedback device 26 generating a corresponding control signal such that the haptic feedback device 26, in particular the actuator 28, is controlled so as to output a haptic feedback.

The haptic feedback device 26, in particular the actuator 28, is then set in motion, the corresponding motion being converted into a rotary motion of the operating surface 16 about the axis of rotation A by the motion coupling member 30, such that the operating surface 16 is actively rotated about the axis of rotation A.

The axis of rotation A is substantially parallel to the operating surface 16. In other words, the axis of rotation A is located in a plane parallel to the plane spanned by the operating surface 16 when the operating surface 16 is in its initial position.

The rotary motion of the operating surface 16 is therefore initiated by the haptic feedback device 26, such that a defined rotary motion occurs which differs from an undefined vibration of the operating surface 16.

In the embodiments shown, a solenoid is shown as actuator 28. Alternatively, an unbalance motor, a piezo actuator and/or a silicon actuator may also be provided as an actuator 28, which is controlled accordingly in order to initiate a motion which is converted into a rotary motion of the operating surface 16 or of the operating element 17 about the axis of rotation A by the motion coupling member 30.

Using the motor vehicle operating unit 10 according to the invention, it is thus possible to simply generate a defined haptic feedback, which can be assigned by the vehicle occupant in a simple way, the defined haptic feedback being a rotation about the axis of rotation A.

The invention claimed is:

1. A motor vehicle operating unit for a motor vehicle, having a haptic feedback device and an operating surface rotatable about an axis of rotation, the axis of rotation being substantially parallel to a plane spanned by the operating surface in the initial position of the motor vehicle operating unit, the haptic feedback device being arranged so as to control the operating surface such that the operating surface rotates about the axis of rotation.

2. The motor vehicle operating unit according to claim 1, wherein a housing is provided, in which the haptic feedback device is received.

3. The motor vehicle operating unit according to claim 2, wherein the haptic feedback device has at least one actuator which is supported at least partially on the housing.

4. The motor vehicle operating unit according to claim 2, wherein the operating surface is part of an operating unit which is at least partially received in the housing.

5. The motor vehicle operating unit according to claim 4, wherein the operating unit has at least one sensor for detecting at least one of an actuation of the operating surface, a touch of the operating surface, and an approach to the operating surface.

6. The motor vehicle operating unit according to claim 4, wherein the operating unit comprises at least one of a capacitive sensor and a force sensor.

7. The motor vehicle operating unit according to claim 4, wherein a printed circuit board which is assigned to the operating surface is provided, the printed circuit board being part of the operating unit.

8. The motor vehicle operating unit according to claim 1, wherein the haptic feedback device is coupled with the operating surface via a motion coupling member.

9. The motor vehicle operating unit according to claim 8, wherein the operating surface is rotatably mounted on the housing via the motion coupling member.

10. The motor vehicle operating unit according to claim 8, wherein the motion coupling member is configured so as to convert a motion of the haptic feedback device in several directions into a rotary motion of the operating surface about the axis of rotation.

11. The motor vehicle operating unit according to claim 1, wherein a printed circuit board which is assigned to the operating surface is provided.

12. The motor vehicle operating unit according to claim 11, wherein the printed circuit board is motionally decoupled from the operating surface.

13. The motor vehicle operating unit according to claim 1, wherein the operating surface is configured in a closed manner and comprises at least two buttons.

14. The motor vehicle operating unit according to claim 13, wherein the at least two buttons have a key contour on the operating surface configured in a closed manner.

15. A method of confirming a switching command by means of a motor vehicle operating unit, comprising the following steps:
- sensing at least one of an approach to an operating surface of the motor vehicle operating unit, a touch of the operating surface of the motor vehicle operating unit, and an actuation of the operating surface of the motor vehicle operating unit,
- controlling a haptic feedback device assigned to the operating surface to output a haptic feedback, and
- actively rotating the operating surface about an axis of rotation which is substantially parallel to a plane spanned by the operating surface in the initial position of the motor vehicle operating unit, the rotary motion of the operating surface being initiated by the control of the haptic feedback device.

\* \* \* \* \*